(12) United States Patent
Li et al.

(10) Patent No.: US 8,659,314 B2
(45) Date of Patent: Feb. 25, 2014

(54) TEST APPARATUS FOR PERIPHERAL COMPONENT INTERCONNECT EXPANSION SLOT

(75) Inventors: Hua Li, Shenzhen (CN); Rui Wu, Shenzhen (CN); Xiao-Wei Fu, Shenzhen (CN); Hua Yue, Shenzhen (CN); Tai-Chen Wang, Tu-Cheng (TW); Xue-Hong Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 293 days.

(21) Appl. No.: 13/092,220

(22) Filed: Apr. 22, 2011

(65) Prior Publication Data
US 2012/0256650 A1    Oct. 11, 2012

(30) Foreign Application Priority Data

Apr. 7, 2011 (CN) .......................... 2011 1 0086149

(51) Int. Cl.
*G01R 31/00* (2006.01)

(52) U.S. Cl.
USPC ................................. 324/756.07; 324/763.01

(58) Field of Classification Search
None
See application file for complete search history.

(56) References Cited

U.S. PATENT DOCUMENTS

| | | | | |
|---|---|---|---|---|
| 5,929,627 | A | * | 7/1999 | MacPherson et al. ... 324/763.01 |
| 6,415,346 | B1 | * | 7/2002 | Mueller et al. ................ 710/302 |
| 2003/0101303 | A1 | * | 5/2003 | Kung ............................. 710/301 |
| 2005/0223246 | A1 | * | 10/2005 | Bacchus et al. ................ 713/300 |
| 2007/0168566 | A1 | * | 7/2007 | Hsiao et al. ........................ 710/2 |

* cited by examiner

*Primary Examiner* — Minh N Tang
(74) *Attorney, Agent, or Firm* — Altis Law Group, Inc.

(57) ABSTRACT

A test apparatus includes a circuit board. The circuit board includes a number of first golden fingers arranged on a first side of the circuit board, and a first test circuit. The first test circuit includes a first capacitor. A first terminal of the first capacitor is grounded. A second terminal of the first capacitor is electrically connected to a first pin of the first golden fingers. A first test pad is connected to the second terminal of the first capacitor. A second test pad is connected to a second pin of the first golden fingers. The second pin is grounded.

7 Claims, 2 Drawing Sheets

TEST APPARATUS FOR PERIPHERAL COMPONENT INTERCONNECT EXPANSION SLOT

BACKGROUND

1. Technical Field

The present disclosure relates to a test apparatus for peripheral component interconnect (PCI) expansion slots and PCI Express (PCIe) expansion slots.

2. Description of Related Art

When a PCI expansion slot or a PCIe expansion slot is tested, testers usually solder testing probes on a bottom surface of a circuit board below the expansion slot, to receive signals from the PCI expansion slot or the PCIe expansion slot. It is a delicate task and often results in damage to the circuit board.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
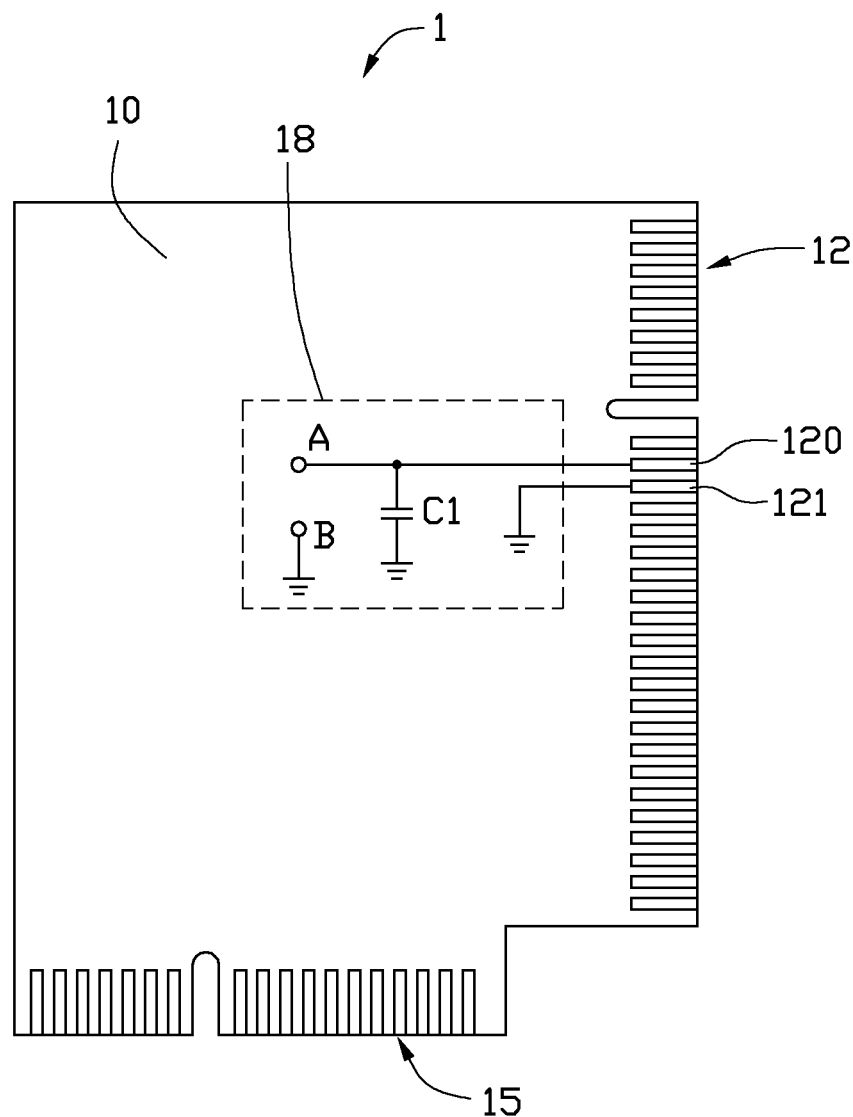
FIG. 1 is a schematic diagram of a first surface of an exemplary embodiment of a test apparatus.
Figure 2:
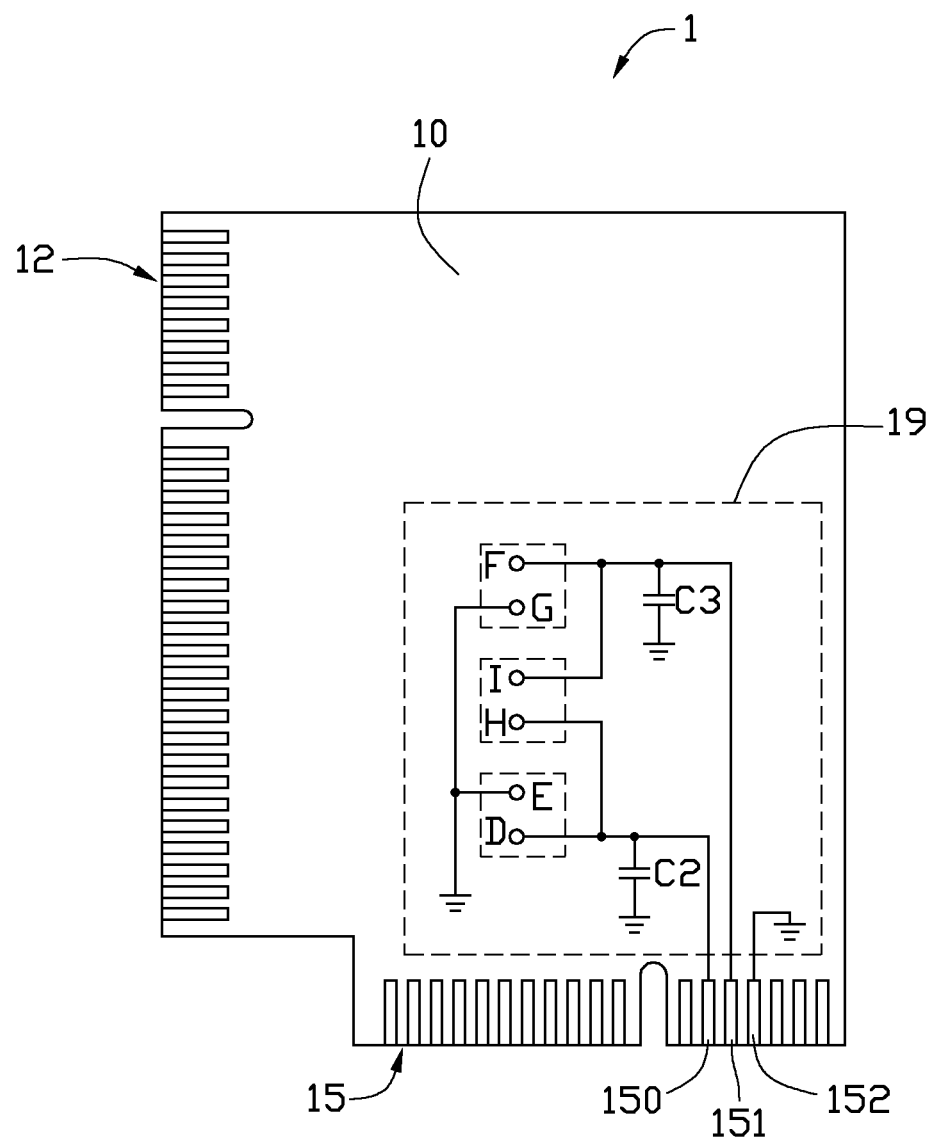
FIG. 2 is a schematic diagram of a second surface of the test apparatus of FIG. 1.

Referring to FIGS. 1 and 2, an exemplary embodiment of a test apparatus 1 includes a circuit board 10. A plurality of first golden fingers 12, a plurality of second golden fingers 15, a first test circuit 18, and a second test circuit 19 are arranged on the circuit board 10.

The first golden fingers 12 are arranged on a first side of the circuit board 10. The second golden fingers 15 are arranged on a second side of the circuit board 10 adjacent to the first side. In the embodiment, the first golden fingers 12 are the same as the golden fingers of a conventional peripheral component interconnect (PCI) card. The second golden fingers 15 are same as the golden fingers of a conventional PCI Express (PCIe) card. In other embodiments, the first and second sides of the circuit board can be opposite to each other.

The first test circuit 18 is electrically connected to pins 120 and 121 of the first golden fingers 12. The second test circuit 19 is electrically connected to pins 150, 151, and 152 of the second golden fingers 15.

The first test circuit 18 includes a capacitor C1, a first test pad A, and a second test pad B. A first terminal of the capacitor C1 is grounded. A second terminal of the capacitor C1 is electrically connected to the pin 120 of the first golden fingers 12 and the first test pad A. The second test pad B and the pin 121 of the first golden fingers 12 are grounded.

In use, the first golden fingers 12 of the test apparatus 1 is plugged into a PCI expansion slot on a motherboard. At this time, the pin 120 of the first golden fingers 12 is electrically connected to a clock pin of the PCI expansion slot, and the pin 121 of the first golden fingers 12 is electrically connected to a ground pin of the PCI expansion slot. As a result, when two test probes are connected to the first test pad A and the second test pad B, respectively, clock signals from the PCI expansion slot can be tested. Moreover, capacitance of the capacitor C1 matches impedance of the transmission line between the first test pad A and the pin 120, to reduce reflected signals at the first test pad A, thereby improving precision.

The second test circuit 19 includes two capacitors C2 and C3, and six test pads D to G. A first terminal of the capacitor C2 is grounded. A second terminal of the capacitor C2 is electrically connected to the test pads D and H, and the pin 150 of the second golden fingers 15. A first terminal of the capacitor C3 is grounded. A second terminal of the capacitor C3 is electrically connected to the test pads F and I, and the pin 151 of the second golden fingers 15. The test pads G and E are grounded. The pin 152 of the second golden fingers 15 is grounded.

In use, the second golden fingers 12 of the test apparatus 1 are plugged into a PCIe expansion slot. At this time, the pins 150 and 151 of the second golden fingers 15 are electrically connected to clock pins of the PCIe expansion slot, and the pin 152 of the second golden fingers 15 is electrically connected to a ground pin of the PCIe expansion slot. The two clock pins of the PCIe expansion slot transmit differential signals. As a result, when two test probes are connected to the test pads D and E, respectively, a first clock signal from the PCIe expansion slot can be tested. When two test probes are connected to the test pads F and G, respectively, a second clock signal from the PCIe expansion slot can be tested. When two test probes are connected to the test pads H and I, respectively, the differential clock signals, namely the first clock signal and the second clock signal, from the PCIe expansion slot can be tested.

Moreover, same as the first test circuit 18, capacitance of the capacitor C2 matches impedance of the transmission line between the test pad D and the pin 150, to reduce reflected signals at the test pad D. Capacitance of the capacitor C3 matches impedance of the transmission line between the test pad F and the pin 151, to reduce reflected signals at the fifth test pad F.

In the embodiment, the first test circuit 18 is arranged on a first surface, and the second test circuit 19 is arranged on a second surface of the circuit board 10 opposite to the first surface, thereby the circuit board 10 having enough wiring space. In other embodiments, if the circuit board 10 has enough space to wire the first test circuit 18 and the second test circuit 19, the first test circuit 18 and the second test circuit 19 can be arranged on a same surface of the circuit board 10.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A test apparatus comprising:

a circuit board comprising a plurality of first golden fingers arranged on a first side of the circuit board, and a first test circuit, wherein the first test circuit comprises:

a first capacitor, wherein a first terminal of the first capacitor is grounded, and a second terminal of the first capacitor is electrically connected to a first pin of the first golden fingers;

a first test pad connected to the second terminal of the first capacitor; and a second test pad connected to a second pin of the first golden fingers, wherein the second pin is grounded;

wherein the circuit board further comprises a plurality of second golden fingers arranged on a second side of the circuit board, and a second test circuit, the second test circuit comprises:

a second capacitor, wherein a first terminal of the second capacitor is grounded, and a second terminal of the second capacitor is electrically connected to a first pin of the second golden fingers;

a third capacitor, wherein a first terminal of the third capacitor is grounded, and a second terminal of the third capacitor is electrically connected to a second pin of the second golden fingers; and third to eighth test pads, wherein the third test pad is electrically connected to the second terminal of the second capacitor, the fourth test pad is grounded, the fifth test pad is electrically connected to the second terminal of the third capacitor, the sixth test pad is grounded, the seventh test pad is electrically connected to the third test pad, the eighth test pad is electrically connected to the fifth test pad; a third pin of the second golden fingers is grounded.

2. The test apparatus of claim 1, wherein the first golden fingers are peripheral component interconnect golden fingers.

3. The test apparatus of claim 1, wherein the first and second pins of the first golden fingers are operable to transmit clock signals.

4. The test apparatus of claim 1, wherein the second golden fingers are peripheral component interconnect express golden fingers.

5. The test apparatus of claim 1, wherein the first, second, and third pins of the second golden fingers are operable to transmit clock signals.

6. The test apparatus of claim 1, wherein the first and second test circuits are arranged on a same surface of the circuit board.

7. The test apparatus of claim 1, wherein the first and second test circuits are arranged on opposite surfaces of the circuit board.

* * * * *